(12) United States Patent
Benzerrouk

(10) Patent No.: US 11,053,140 B2
(45) Date of Patent: *Jul. 6, 2021

(54) HIGH VOLTAGE (PLASMA) BASED WATER DISINFECTION METHOD AND SYSTEM FOR WATER CONTAINERS

(71) Applicant: Vegapure Water System, Inc., Windham, NH (US)

(72) Inventor: Souheil Benzerrouk, Windham, NH (US)

(73) Assignee: Vegapure Water System Inc., Windham, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,299

(22) Filed: Feb. 18, 2020

(65) Prior Publication Data

US 2020/0325040 A1  Oct. 15, 2020

Related U.S. Application Data

(63) Continuation-in-part of application No. 16/190,481, filed on Nov. 14, 2018, now Pat. No. 10,604,422.

(51) Int. Cl.
*C02F 1/30* (2006.01)
*C02F 1/00* (2006.01)
*C02F 1/46* (2006.01)

(52) U.S. Cl.
CPC .............. *C02F 1/30* (2013.01); *C02F 1/008* (2013.01); *C02F 1/4608* (2013.01); *C02F 2201/009* (2013.01); *C02F 2303/04* (2013.01)

(58) Field of Classification Search
CPC .......... C02F 1/30; C02F 1/008; C02F 1/4608; C02F 2101/10; C02F 2101/30; C02F 2201/009; C02F 2303/04; H05H 1/48
USPC ........................... 250/453.11, 454.11, 455.11
See application file for complete search history.

(56) References Cited

U.S. PATENT DOCUMENTS 10,604,422 B2 * 3/2020 Benzerrouk .............. C02F 1/30

* cited by examiner

*Primary Examiner* — Nicole M Ippolito
(74) *Attorney, Agent, or Firm* — Bourque & Associates

(57) ABSTRACT

A water disinfection system preferably includes a battery compartment, a control printed circuit board (PCB) to manage several parameters including timing, voltage rate, and user-interface. A high voltage power supply is coupled to a set of electrodes to cause an electric discharge. The electric discharge results in a series of reactions in the water that eliminate bacteria and viruses, dissolves organic material, and oxidizes inorganic compounds.

16 Claims, 6 Drawing Sheets

HIGH VOLTAGE (PLASMA) BASED WATER DISINFECTION METHOD AND SYSTEM FOR WATER CONTAINERS

CROSS-REFERENCE TO RELATED APPLICATIONS

This application is a continuation-in-part of U.S. patent application Ser. No. 16/190,481 filed on Nov. 14, 2018 entitled "Water Container with Integrated Plasma Disinfection" which claims priority from U.S. Provisional Patent Application No. 62/585,750 titled "A PORTABLE WATER CONTAINER WITH INTEGRATED PLASMA DISINFECTION", filed on Nov. 14, 2017, both of which are incorporated fully herein by reference.

TECHNICAL FIELD

The present invention relates generally to nonchemical disinfection of water stored in water storage containers such as permanent and movable water storage tanks, as well as portable water storage containers and more particularly, to a system and method for utilizing plasma or high voltage energy to eliminate bacteria, viruses, organic compounds and emergent contaminants in portable and storage water vessels.

BACKGROUND INFORMATION

Traditional water disinfection systems utilize ultra-violet light in the germicidal range to inactivate bacteria and eliminate viruses or Ozone gas to oxidize most microorganisms. While largely successful with known pathogens, emergent contaminants may present a challenge where the aforementioned methods fail to sanitize water to an acceptable standard. To address such challenges, newer, highly effective methods are evaluated. In this invention we describe the utilization of an electric discharge directly induced in the fluid to cause various reactions to occur including the generation of the highly reactive hydroxyl radical (OH), atomic oxygen, ozone, and even ultra-violet radiation. These reactions are highly effective in the elimination of bacteria, viruses, and many organic and inorganic compounds.

SUMMARY

A water container or bottle with integrated disinfection preferably includes a battery compartment, a control printed circuit board (PCB) to manage several parameters including: timing, voltage rate, and user-interface. The system further includes a high voltage power supply, and, in one embodiment, a set of electrodes connected directly to the power supply to cause an electric discharge based on Paschen's Law. The electric discharge results in a series of reactions that eliminate bacteria and viruses, dissolves organic material, and oxidizes inorganic compounds. The containers can be permanently mounted water storage vessels or portable containers utilized by hikers, campers, or in remote areas where access to treated water is difficult or impossible as well as in disaster areas. These water containers or vessels can range from a small portable bottle to a large drum, barrel, tank or other water storage container of almost any size, provided the high voltage/plasma disinfection unit is appropriately sized and configured to handle the size of the container and the water volume.

Several embodiments have been devised for various applications including: needle type electrodes, plate type electrodes, a combination of needles and a mesh strainer, a double mesh or needle type electrodes with plate type, or even a metal or metalized container wall either placed as an inside wall in double walled containers or the outside wall in single wall containers.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

A water disinfection system for water storage and portable water storage tanks and vessels in accordance with the teachings of the present invention uses a high voltage/plasma arc/energy to eliminate bacteria, viruses and emerging contaminants thereby sanitizing water in the container equipped with the disinfection system of the invention to an acceptable standard or level.

Figure 1:
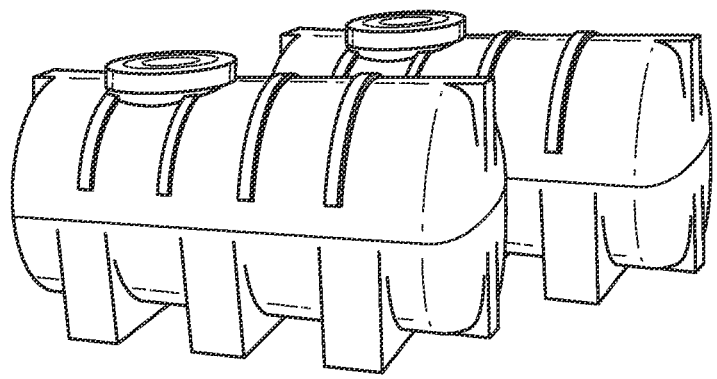
FIGS. 1 and 2 are images of prior art water storage tanks with which the present invention may be utilized.
Figure 2:
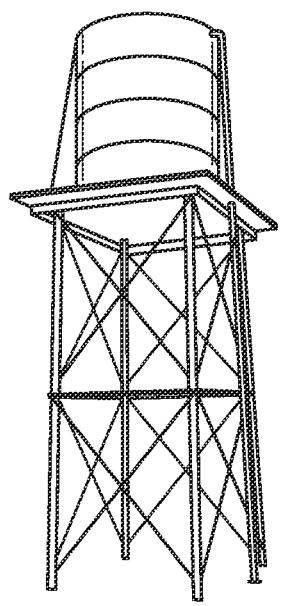
Figure 3:
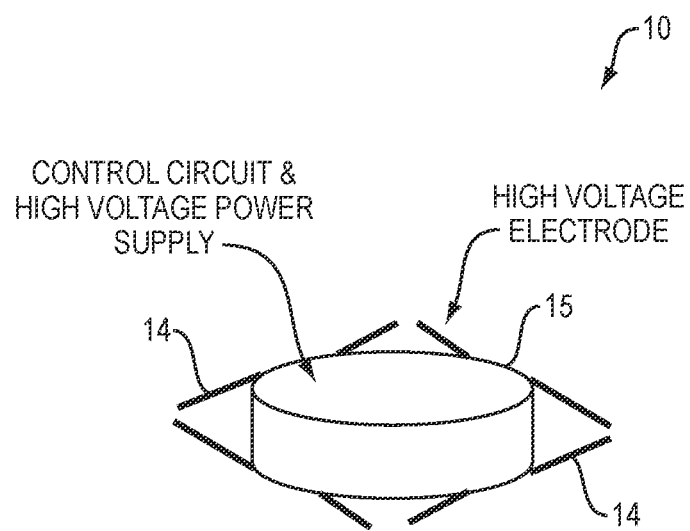
FIG. 3 is a representation of the parts of a system containing needle type electrodes and control/high voltage electronics to drive the said electrodes in accordance with the teachings of the present invention.
Figure 4:
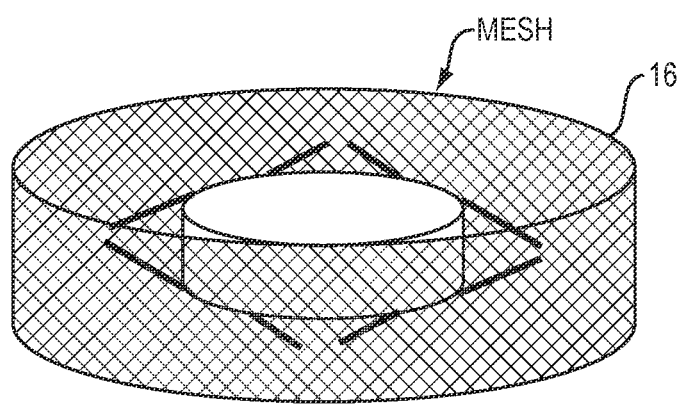
FIG. 4 is depicts the system of FIG. 3 with a mesh surrounding the electrodes and electronics to protect the electrodes from potential sediments and debris.

The disinfection system 10, FIG. 3, in accordance with a first embodiment of the invention is comprised of a number of high voltage electrodes 14 coupled to a high voltage power supply 15. A metal or metalized mesh 16, FIG. 4 surrounds the high-voltage power supply 15 and the high-voltage electrodes 14 in order to prevent debris from touching the electrodes 14. In another embodiment shown in FIG. 5 the inner and outer mesh 16, 18 serve as the electrodes and are electrically coupled to the high voltage power supply. In one embodiment, a battery and a control PCB, as required, may all built into the high-voltage power supply system 15 that is dropped or lowered into a water storage tank. In another embodiment, the battery and a control PCB may be mounted on the top, side or remote from the storage vessel.

In operation and in order to disinfect water, upon activation either automatically based on time or other pre-programmed parameter, a voltage breakdown is initiated between two or more of the high voltage electrodes 14 and/or between an electrode or power supply and the metal or metalized strainer 16. A charging and control PCB contains all control electronics including a timer to ensure the discharge is active for a sufficient time to effectively disinfect the volume of the fluid in the vessel and in general to control all operation parameters of the disinfection system.

The high voltage power source controller provides a control signal to the source of high voltage power such that the source of high voltage power creates a potential difference between first and second electrodes that is greater than a threshold voltage, such that:

$$V \geq \sqrt{\frac{kRT_0^2}{\sigma_0 E_a}} \frac{L}{R_0}$$

wherein $E_a$ is the activation energy, $\sigma_0$ is the electric conductivity of the medium, R is the universal gas constant, L is the distance between the electrodes, and $R_0$ is the radius of the discharge stream.

Figure 5:
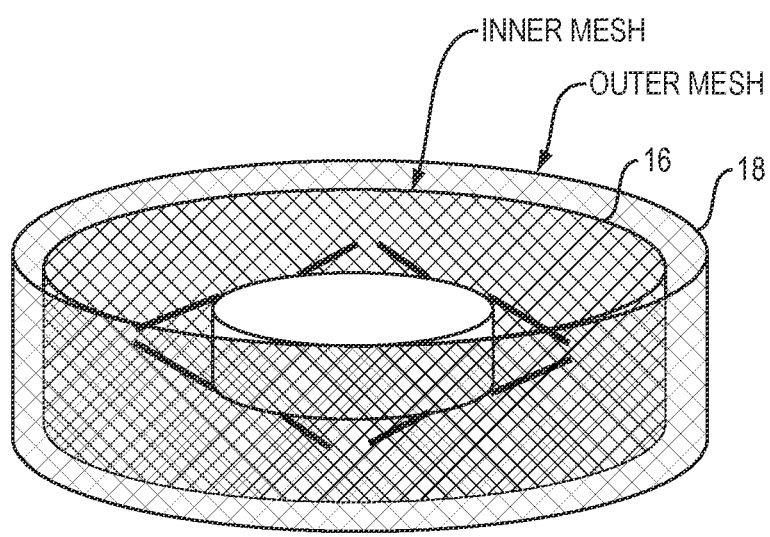
FIG. 5 is one embodiment of the present invention illustrating the water disinfection system with a double-mesh electrode protection.
Figure 6:
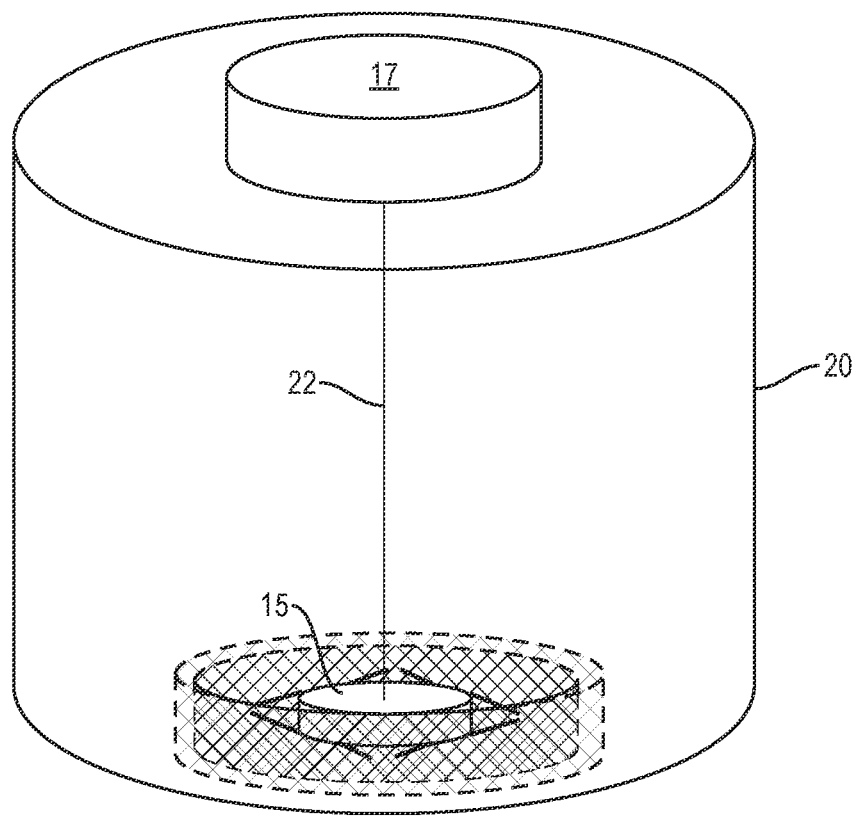
FIG. 6 is a representation of the high voltage/plasma disinfection system of FIG. 3 integrated into a water storage tank.
Figure 7:
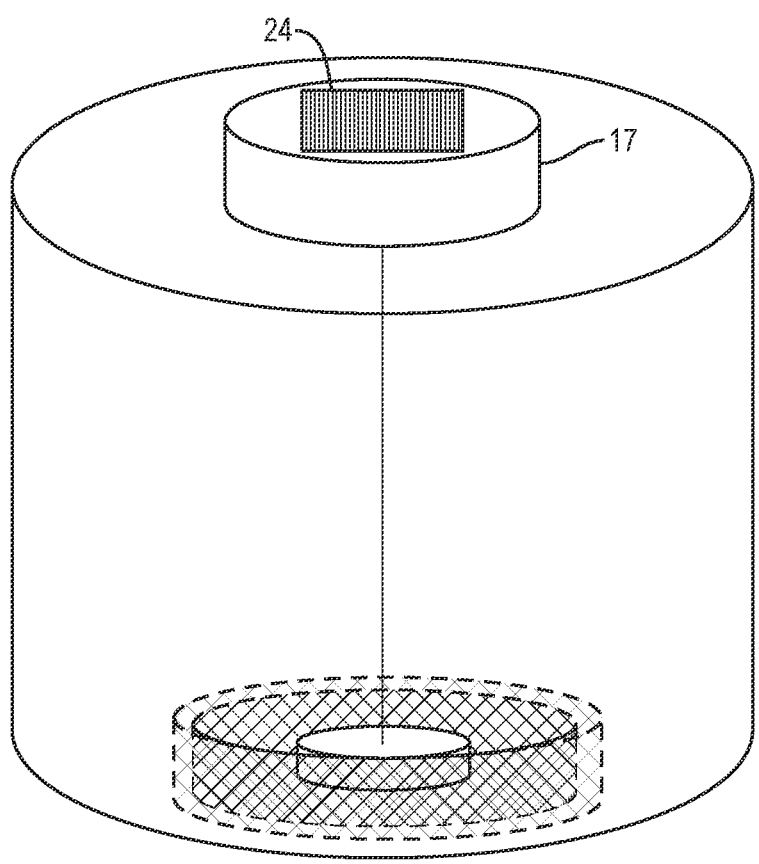
FIG. 7 is a representation of the high voltage/plasma disinfection system according to FIG. 3 integrated and installed in a water storage tank with a solar cell to charge the batteries or drive the electronics including the high-voltage power supply and the control circuit.

In another embodiment as shown in FIG. 5, both an inner mesh 16 and an outer mesh 18 may be provided. In yet another embodiment shown in FIG. 6, a high voltage power supply and PCB control board 17 may be disposed on the exterior of the water tank 20 and power provide to the electrodes via a power cable 22. In a further embodiment, a solar array 24 may be provided to provide electricity to the power supply 17.

The system is activated either through a switch selected by a user or automatically based on a schedule for example 1 minute every hour with a minimum of 8 hours since bacterial regrowth happens every 8 to 11 hours.

Modifications and substitutions by one of ordinary skill in the art are considered to be within the scope of the present invention and are not to be limited except by the allowed claims and their legal equivalent.

The invention claimed is:

1. A water sanitation system that utilizes high voltage or plasma for the disinfection of water in a storage tanks or container, said water disinfection system comprising:
    a source of high voltage power, said source of high voltage power responsive to a control signal, for providing high voltage power to one or more coupled devices;
    at least first and second electrodes, electrically coupled to said source of high voltage power, and configured for being submerged in said water and energized by said source of high voltage power;
    a high voltage power source controller, coupled to said source of high voltage power, and responsive to an activation signal, for providing said control signal to said source of high voltage power for selectively providing said high voltage power to said at least first and second electrodes under control of said control signal; and
    an activation device, coupled to said high voltage power source controller, and configured for providing said activation signal to said high voltage power source controller.

2. The high voltage/plasma disinfection system of claim 1, wherein said control signal provided by said high voltage power source controller to said source of high voltage power controls activation and deactivation of said high voltage power source, activation time/duration of said high voltage power source, an amount of voltage provided by said high voltage power source and an amount of electrical current provided by said high voltage power source.

3. The water disinfection system of claim 1, wherein said activation device in a user activatable device.

4. The water disinfection system of claim 3, wherein said user activatable device is automatic and scheduled based on a user defined or factory default schedule to prevent bacteria growth and regrowth.

5. The water disinfection system of claim 1, wherein said at least first and second electrodes include a metal or metalized mesh cover and a high voltage electrode.

6. The water disinfection system of claim 1, wherein said first and second electrodes are a metal or metalized mesh cover.

7. The water disinfection system of claim 1, wherein said high voltage power source controller provides said control signal to said source of high voltage power such that said source of high voltage power creates a potential difference between first and second electrodes that is greater than a threshold voltage, such that:

$$V \geq \sqrt{\frac{kRT_0^2}{\sigma_0 E_a}} \frac{L}{R_0}$$

wherein $E_a$ is the activation energy, $\sigma_0$ is the electric conductivity of the medium, R is the universal gas constant, L is the distance between the electrodes, and $R_0$ is the radius of the discharge stream.

8. The water disinfection system of claim 1 wherein said disinfection is based on a plasma discharge and wherein said discharge or plasma discharge is generated between two or more electrodes directly in the water.

9. The water disinfection system of claim 1 wherein the system ON/OFF setting, time duration of the discharge (exposure time), voltage, and current further are provided by said control PCB to manage and control disinfection parameters.

10. The water disinfection system of claim 8 wherein two or more electrodes are required which can take the form of needles, probes, plates, meshes, or a combination thereof connected to said high voltage power supply.

11. The water disinfection system of claim 1 wherein the electrodes are made of a combination of one or multiple needle, pin or probe and a strainer (a metal or metalized mesh or porous metalized material) combination and wherein the discharge is initiated between the needle type electrodes and the strainer.

12. The water disinfection system of claim 1 where the mesh further performs basic filtering such that solids and debris does not contaminate the electrodes.

13. The water disinfection system of claim 1, wherein batteries deliver a direct current (DC) to a high voltage power converter and a control circuit, and wherein the batteries can be either alkaline or rechargeable.

14. The water disinfection system of claim 1, wherein solar cells are integrated to the storage vessel to charge the on-board batteries.

15. The water disinfection system of claim 1, where the electrodes are a set of needles spaced appropriately to guarantee a breakdown at the available voltage.

16. The water disinfection system of claim 1, where the voltage is pulsed to further enhance disinfection efficiency and performance.

* * * * *